(12) United States Patent
Corcoran et al.

(10) Patent No.: US 7,714,069 B2
(45) Date of Patent: *May 11, 2010

(54) METHOD OF PRODUCING ADHERENT COATINGS ON RESINOUS SUBSTRATES

(75) Inventors: Patrick Henry Corcoran, Cherry Hill, NJ (US); Sheau-Hwa Ma, West Chester, PA (US); Jozef Theresia Huybrechts, Turnhout (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/526,036

(22) Filed: Sep. 22, 2006

(65) Prior Publication Data

US 2007/0066757 A1    Mar. 22, 2007

Related U.S. Application Data

(60) Provisional application No. 60/719,659, filed on Sep. 22, 2005.

(51) Int. Cl.
C08F 8/30 (2006.01)

(52) U.S. Cl. .................. 525/123; 525/539

(58) Field of Classification Search .......... 525/127, 525/128
See application file for complete search history.

(56) References Cited

U.S. PATENT DOCUMENTS

| | | | |
|---|---|---|---|
| RE27,145 E | 6/1971 | Jones | |
| 3,629,172 A | 12/1971 | Jones | |
| 3,652,732 A | 3/1972 | Makowski et al. | |
| 4,039,593 A | 8/1977 | Kamienski et al. | |
| 4,439,593 A * | 3/1984 | Kelso et al. ............ | 528/45 |
| 4,504,534 A * | 3/1985 | Adachi et al. .......... | 428/71 |
| 4,518,753 A | 5/1985 | Richards et al. | |
| 4,865,705 A * | 9/1989 | Hendrikx et al. ....... | 204/506 |
| 4,997,882 A | 3/1991 | Martz et al. | |
| 5,039,755 A | 8/1991 | Chamberlain et al. | |
| 5,115,007 A * | 5/1992 | Chihara et al. ......... | 524/267 |
| 5,221,707 A | 6/1993 | Chihara et al. | |
| 5,281,443 A * | 1/1994 | Briggs et al. .......... | 427/407.1 |
| 5,286,782 A | 2/1994 | Lamb et al. | |
| 5,306,778 A * | 4/1994 | Ishida et al. ........... | 525/310 |
| 5,319,032 A | 6/1994 | Martz et al. | |
| 5,376,745 A | 12/1994 | Handlin, Jr. et al. | |
| 5,397,602 A | 3/1995 | Martz et al. | |
| 5,486,570 A | 1/1996 | St. Clair | |
| 5,496,870 A * | 3/1996 | Chawla et al. ......... | 522/90 |
| 5,792,815 A | 8/1998 | Schwindeman et al. | |
| 6,025,433 A * | 2/2000 | Shibatoh et al. ....... | 524/590 |
| 6,146,706 A * | 11/2000 | Verardi et al. ......... | 427/393.5 |
| 6,203,913 B1 | 3/2001 | Kondos et al. | |
| 6,221,494 B1 | 4/2001 | Barsotti et al. | |
| 7,078,474 B2 * | 7/2006 | Hermann et al. ....... | 528/45 |
| 2005/0154121 A1 | 7/2005 | Fan et al. | |

FOREIGN PATENT DOCUMENTS

| | | |
|---|---|---|
| GB | 2 270 317 A | 3/1994 |
| JP | 06 179849 | 6/1994 |

OTHER PUBLICATIONS

Mark, Herman, et al., eds. Encyclopedia of Polymer Science and Engineering, 2nd ed.; Polyurethanes, vol. 13, p. 254. J. Wiley and Sons: New York, NY. 1985.*
Mark, Herman et al., eds. Encyclopedia of Polymer Science and Engineering, $2^{nd}$ ed. Polyurethanes, vol. 13. p. 254. J. Wiley and Sons: New York, NY. 1985.*
Mark, Herman et al., eds. Encyclopedia of Polymer Science and Engineering, 2nd ed. Polyurethanes, vol. 13. p. 254, 258. J. Wiley and Sons: New York, NY. 1985.*
Fox, "Influence of Diluent and of Copolymer Composition on the Glass Temperature of a Polymer System", Bull. Amer. Physics Soc., 1,3, p. 123.
PCT International Search Report and Written Opinion for International Application No. PCT/US2006/037135 dated Apr. 16, 2007.

* cited by examiner

Primary Examiner—Randy Gulakowski
Assistant Examiner—Kyle Baumstein
(74) Attorney, Agent, or Firm—Brian J. Myers

(57) ABSTRACT

The present invention is directed to a method of producing an adherent coating over untreated thermoplastic and thermosetting resinous substrates from a coating composition that includes a crosslinkable component and a crosslinking component that are mixed prior to application and applied over the substrate. The crosslinkable component includes a polymeric mix containing at least one crosslinkable copolymer polymerized from a monomer mixture comprising one or more ethylenically unsaturated monomers having on average 1 to 10, preferably 1 to 4 and more preferably 1 to 2 hydroxyl groups and a saturated hydrocarbon polymer. The crosslinkable component includes one or more cycloaliphatic polyisocyanate of the formula:

$$R^1\text{—}(R^2\text{—}NCO)_n$$

wherein $R^1$ is a substituted or unsubstituted cycloaliphatic group, $R^2$ is independently selected from a direct bond, a straight aliphatic group or branched aliphatic group, and wherein n ranges from 2 to 10. The method is well suited to produce adherent coatings on olefinic substrates such as those used in automotive and general commercial application without any pretreatment of the resinous substrates.

22 Claims, No Drawings

METHOD OF PRODUCING ADHERENT COATINGS ON RESINOUS SUBSTRATES

CROSS-REFERENCE TO RELATED APPLICATION

This application claims priority under 35 U.S.C. §119 from U.S. Provisional Application Ser. No. 60/719,659, filed Sep. 22, 2005.

FIELD OF INVENTION

The present invention is directed to a method of producing adherent coatings over untreated resinous substrates and more particularly directed to a method that produces adherent coatings over the resinous substrates without the need to prepare the substrate surfaces before the application of a coating composition.

BACKGROUND OF INVENTION

Resinous materials, such as thermoplastic olefins (TPO), sheet molding compounds (SMC), engineering polymers, such as Noryl GTX® polyamide (PA) reinforced with a modified polyphenylene ether polymer (PPE) supplied by GE Company, and reaction injection molded (RIM) polyurethane are used in many applications, such as automobile parts and accessories, containers, household appliances and other commercial items. It is often desirable to coat articles made from such resinous materials with coatings that are esthetically pleasing. Such coatings are also used to protect such articles from degradation when exposed to atmospheric weathering conditions, such as sunlight, moisture, heat and cold. To produce longer lasting and more durable articles from resinous materials, it is necessary for the coatings to tightly adhere to the surface of such articles.

Resinous substrates made from a variety of thermoplastic and thermosetting resinous materials have widely varying surface properties, including surface tension, roughness, flexibility, and have widely varying bulk properties such as solubility parameter, which make it difficult to achieve adequate adhesion of the coatings to such materials, particularly upon aging or environmental exposure of the resinous materials. It is well known to apply an adhesion promoter or tie coat on a resinous substrate surface to improve adherence of the coating to the surface. The application of an adhesion promoter or tie coat is normally an added step in the coating process. The adhesion promoter is usually applied in a thin layer, normally about 6.35 micrometers (0.25 mils). Typically, adhesion promoters used on TPO plastic surfaces contain chlorinated polyolefins, some examples of which are described in U.S. Pat. Nos. 4,997,882; 5,319,032 and 5,397,602. Additionally, flame or corona pretreatment steps can be also used to facilitate adequate adhesion of organic coatings to some resinous substrates.

The use of adhesion promoters and/or corona pretreatments in a coating system used to coat resinous substrates, adds complexity and cost to the system. The application of an adhesion promoter usually entails coating the resinous substrate with the promoter, followed by some drying or curing time which increases the time of the entire coating process and will usually necessitate additional workspace. Accordingly, coating compositions which exhibit excellent adhesion directly to resinous materials, such as TPO and Noryl GTX® polyamide without the use of adhesion promoters or tie coats are desirable.

Polyolefin diols have been used in coating compositions to impart adhesion to the resinous substrate without the use of adhesion promoters or tie coats. However, polyolefin diols may be incompatible with the resins and/or crosslinking agents used in some coating compositions. For example, U.S. Pat. No. 6,203,913 discloses an adhesion promoter containing a mixture of one or more conventional crosslinkable film forming resins having crosslinkable groups, such as those from polyesters, and acrylic polymers; one or more conventional crosslinking materials that are capable of reacting with film forming resins, such as aminoplasts and isocyanates; and an adhesion promoting agent, such as polyolefin diol. However, a need still exists to improve compatibility of the adhesion-promoting agent, film forming resins and crosslinking materials in such coating compositions.

STATEMENT OF INVENTION

The present invention is directed to a coating composition that when applied over a resinous substrate, produces an adherent coating thereon, said composition comprising:

(a) a crosslinkable component comprising a polymeric mix containing at least one crosslinkable copolymer polymerized from a monomer mixture comprising one or more ethylenically unsaturated monomers having on average 1 to 10, preferably 1 to 4 and more preferably 1 to 2 hydroxyl groups and a saturated hydrocarbon polymer; and (b) a crosslinking component comprising cycloaliphatic polyisocyanate of the formula:

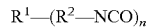
$$R^1-(R^2-NCO)_n$$

wherein $R^1$ is a substituted or unsubstituted cycloaliphatic group containing 3 to 20, preferably 5 to 10 and more preferably 5 to 8 carbon atoms in the ring, $R^2$ is independently selected from a direct bond, a straight aliphatic group or branched aliphatic group, wherein said aliphatic group has from 1 to 6 carbon atoms, preferably 1 to 4 and more preferably 1 to 2, and wherein n ranges from 2 to 10, preferably from 2 to 8 and more preferably from 2 to 5.

The present invention is further directed to a method of producing an adherent coating on a resinous substrate, said method comprising:

(a) mixing a crosslinkable component with a crosslinking component of a coating composition to form a pot mix, said crosslinkable component comprising a polymeric mix containing at least one crosslinkable copolymer polymerized from a monomer mixture comprising one or more ethylenically unsaturated monomers having on average 1 to 10, preferably 1 to 4 and more preferably 1 to 2 hydroxyl groups and a saturated hydrocarbon polymer; and crosslinking component comprising:

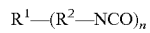
$$R^1-(R^2-NCO)_n$$

wherein $R^1$ is a substituted or unsubstituted cycloaliphatic group containing 3 to 20, preferably 5 to 10 and more preferably 5 to 8 carbon atoms in the ring, $R^2$ is independently selected from a direct bond, a straight aliphatic group or branched aliphatic group, wherein said aliphatic group has from 1 to 6 carbon atoms, preferably 1 to 4 and more preferably 1 to 2, and wherein n ranges from 2 to 10, preferably from 2 to 8 and more preferably from 2 to 5;

(b) applying a layer of said pot mix over said resinous substrate; and (c) curing said into said coating on said resinous substrate.

The present invention is still further directed to a process for producing an adherent coating on an untreated resinous substrate.

DETAILED DESCRIPTION OF PREFERRED THE EMBODIMENT

Unless stated otherwise:

"Low VOC coating composition" means a coating composition that includes in the range of from 0.36 kilograms (0.8 pounds per gallon) to 2.95 kilograms (6.5 pounds per gallon), preferably from 1.18 kilograms (2.6 pounds per gallon) to 2.27 kilograms (5.0 pounds per gallon) and more preferably from 1.27 kilograms (2.8 pounds per gallon) to 2.00 kilograms (4.4 pounds per gallon) of the solvent per liter of the coating composition. All VOC's determined under the procedure provided in ASTM D3960.

"GPC number average molecular weight" means a number average molecular weight measured by utilizing gel permeation chromatography, such as high performance liquid chromatograph (HPLC) supplied by Hewlett-Packard, Palo Alto, Calif. Unless stated otherwise, tetrahydrofuran was used as the liquid phase and polystyrene standards were used.

"Tg" (glass transition temperature) means a temperature measured in ° C. determined by DSC (Differential Scanning Calorimetry) at a rate of heating of 10° C. per minute, with Tg taken at the first inflection point. The Tg of a polymer is a measure of the hardness and melt flow of the polymer. The higher the Tg, the less the melt flow and the harder the coating. Tg is described in Principles of Polymer Chemistry (1953), Cornell University Press. The Tg can be actually measured or it can be calculated as described by Fox in Bull. Amer. Physics Soc., 1, 3, page 123 (1956). Tg, as used herein, refers to actually measured values.

"(Meth)acrylate" means acrylate and methacrylate.

"Polymer solids" or "composition solids" means a polymer or composition in its dry state.

"Crosslinkable component" means a component that includes a compound, polymer, copolymer or a polydisperse mixture of compounds, polymers and/or copolymers all having functional groups positioned in the backbone, pendant from the polymer backbone, terminally positioned on the polymer backbone; or a combination thereof.

"Crosslinking component" is a component that includes a compound, polymer, oligomer, copolymer or a polydisperse mixture of compounds, polymers, oligomers, and/or copolymers all having functional groups positioned in the backbone, pendant from the polymer backbone, terminally positioned on the polymer or oligomer backbone; or a combination thereof, wherein these functional groups are capable of crosslinking with the functional groups on the crosslinkable component (during the curing step) to produce a coating in the form of crosslinked structures.

"Ambient cure condition" is generally defined as the temperature range of 12° C. to 45° C. (54° F. to 113° F.) and a humidity range of 5% to 95% that is present in the spraying area.

"Untreated resinous substrate" means a thermoplastic or thermosetting substrate that has not been pretreated using any means to increase the adhesion of a subsequent coating applied over the substrate. Such treatment methods are well known in the art, such as flame or corona treatments or treating the resinous surface with an adhesion promoter or tie coat to help increase adhesion to the coating composition. A typically used conventional adhesion promoter contains a chlorinated polyolefin. Each of these adhesion-promoting methods increases the complexity and cost of coating such substrates. The resinous substrates suitable for use in the present invention can include any of the thermoplastic or thermosetting synthetic materials commonly used in injection molding, sheet molding, blow molding, vacuum forming or other similar process in which parts are formed. Some of the more suitable resinous substrate include those made form isotactic polypropylene reinforced with a polyethylene-alphaolefin copolymer, polyamide reinforced with a polyphenyleneether, sheet molding compound or a copolymer of acrylonitrile, butadiene and styrene (ABS). However, reaction injection molding compounds (RIMs) are not part of this invention unless they have been reinforced (RRIMs) with conventional reinforcing agents, such as short glass fibers or mineral fillers (mica, wollastonite and others). One example of suitable RRIM is known as Bayflex® 190 polyurethane/polyurea RRIM system (reinforced with 15% mica) from Bayer Material Science, Pittsburgh, Pa.

"Two-pack coating composition" means a curable coating composition having two components stored in separate containers. The containers containing the two components are typically sealed to increase the shelf life of the components of the coating composition. One such component of the two-pack coating composition is a crosslinkable component and the other is a crosslinking component. These components are mixed prior to use to form a pot mix. The pot life of a pot mix is limited, typically to a few minutes (10 minutes to 45 minutes) to a few hours (4 hours to 24 hours). The crosslinking component of this composition includes polyisocyanates. The pot mix is applied as a layer of a desired thickness on a substrate surface, such as an auto body. After application, the layer dries and cures at ambient or elevated temperatures to form a coating on the substrate surface having desired coating properties, such as improved adhesion and chip resistance.

"One-pack coating composition" means a curable coating composition having both the crosslinkable component and the crosslinking component stored together in one pack. The crosslinking component of this composition is selected from the group consisting of blocked polyisocyanates, and mixtures thereof. Typical blocking agents for polyisocyanates include alcohols, ketimines, and oximes. One-pack coating compositions are applied to a suitable substrate and are cured at elevated temperatures to form a durable coating. Since the coating composition of the present invention is directed to a composition that adheres to plastic substrates, the curing temperature should be below that of the softening point of the substrate when formulating and curing a one-pack coating composition. A two-pack coating composition is preferred.

The use of numerical values in the various ranges specified herein is stated as approximations as though the minimum and maximum values within the stated ranges were both being preceded by the word "about." In this manner slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

The novel coating compositions of the present invention are suitable for use as a primer applied directly to a resinous substrate, a colored topcoat applied directly to a resinous substrate, a colored basecoat applied directly to a resinous substrate that is subsequently top coated with a clear topcoat in a basecoat-clear coat coated composite, or a clear topcoat applied directly to a colored resinous substrate.

As used herein, a "predominantly hydrocarbon polymer", means that the saturated hydrocarbon polymer contains about 85 to about 99 weight percent of hydrocarbon units. The saturated hydrocarbon polymer contains less than about 13 percent by weight of heteroatoms, such as oxygen, nitrogen and sulfur. Preferably, the saturated hydrocarbon polymer contains less than 6 percent by weight of heteroatoms, more preferably less than 3 percent, and most preferably less than 1 percent. Typically, the number average molecular weight of the saturated hydrocarbon polymer ranges from about 1000 to 20,000.

The saturated hydrocarbon polymer contains an average of more than one terminal or pendant functional group per molecule, which is capable of reacting with the crosslinking material of the crosslinkable film-forming system. Preferably, the saturated hydrocarbon polymer, which can be present as a mixture of different saturated hydrocarbon polymers, contains an average of about 1.5 to about 6 terminal or pendent functional groups per molecule. More preferably, the saturated hydrocarbon polymer contains two terminal functional groups per molecule.

The functional groups of the saturated hydrocarbon polymer can be carboxyl groups, carbamate groups, hydroxyl groups, amino groups, amide groups, mercaptan groups and mixtures thereof. Preferably, the functional groups are hydroxyl groups. More preferably, the saturated hydrocarbon polymer contains two terminal hydroxyl groups.

The saturated hydrocarbon polymer is at least "substantially saturated", i.e., the hydrocarbon polymer has been hydrogenated, usually after polymerization, such that at least about 90 percent and preferably at least about 95 percent of the carbon to carbon double bonds of the hydrocarbon polymer are saturated. Methods for hydrogenating unsaturated hydrocarbon polymers are well known to those skilled in the art. Examples of useful hydrogenation processes include hydrogenation in the presence of catalysts, such as Raney Nickel; noble metals, such as platinum; soluble transition metal catalysts; and titanium catalysts disclosed in U.S. Pat. No. 5,039,755.

In a preferred embodiment, the saturated hydrocarbon polymer comprises one or more substantially saturated polyhydroxylated polydiene polymers. Polyhydroxylated polydiene polymers made using isoprene or butadiene, as described in U.S. Pat. No. 5,486,570 and U.S. Pat. No. 5,376,745, which are substantially saturated, are suitable for use in the present invention. Preferably the saturated hydrocarbon polymer is formed from saturated polybutadiene Polyhydroxylated polydiene polymers of this type generally have a hydroxyl equivalent weight of between about 500 and about 20,000. Preferably, the saturated polyhydroxylated polydiene polymer is a dihydroxy polybutadiene which contains about two terminal hydroxyl groups, one at each end of the polymer, and has a hydroxyl equivalent weight of about 1,000 to about 5000.

Suitable substantially saturated polyhydroxylated polydiene polymers include those synthesized by free radical polymerization of dienes or anionic polymerization of conjugated diene hydrocarbons, such as butadiene or isoprene, with lithium initiators. The process steps for preparing polyhydroxylated polydiene polymers by anionic polymerization are described in U.S. Pat. No. 4,039,593; Re. 27,145; and U.S. Pat. No. 5,376,745. Such polymers are typically made with a di-lithium initiator, such as a compound formed by reaction of two moles of sec-butyllithium with one mole of diisopropylbenzene. The polymerization of butadiene can be performed in a solvent composed of 90 percent by weight cyclohexane and 10 percent by weight diethylether. The molar ratio of diinitiator to monomer determines the molecular weight of the polymer. The polymer is capped with two moles of ethylene oxide and terminated with two moles of methanol to produce the dihydroxy polybutadiene. The most preferred saturated hydrocarbon polymer is a telechelic polymeric diol, a linear copolymer polymerized from butadiene. Suitable polyhydroxylated polydienes include Kraton liquid polymers HPVM 2200 series and Shell Diol L-2203, which are commercially available from Shell Chemical Co, Houston, Tex. and KRASOL® HLBH-P 3000 from Sartomer Resins, West Chester, Pa.

Other suitable substantially saturated polyhydroxylated polydiene polymers preferably have at least about 90 weight percent repeat units derived from conjugated dienes. The monomers used to form the polymers include olefins having from 2 to 6 carbon atoms such as are disclosed in U.S. Pat. No. 4,518,753 and U.S. Pat. No. 3,652,732. Optionally the polyhydroxylated polydiene polymers can be formed from up to 50 mole percent of ethylenically unsaturated comonomers having from 2 to 10 carbon atoms and substituents including aromatics, halogens, cyanides, esters, and hydroxy esters. Examples of such polymers are hydroxyl terminated diene-based polymers including anionically polymerized dienes, which are given hydroxyl groups in the chain termination step, or free radically polymerized dienes such as those initiated with hydrogen peroxide. Such hydrogenated substantially saturated polyhydroxylated polydiene polymers are described in U.S. Pat. No. 5,115,007 and U.S. Pat. No. 5,221,707. These polymers preferably have a Mn ranging from about 500 to about 20,000 and more preferably about 1,000 to about 8,000 grams per mole and have from 2 to 6 and more preferably from 2 to 4 hydroxyl end groups per polymer chain.

Preferably, the coating composition is essentially free of monohydroxylated diene polymers, i.e., the adhesion promoting agent contains less than 25 weight percent of monohydroxylated diene polymers, preferably less than 10 weight percent and most preferably the coating composition is less than 1.0 weight percent of monohydroxylated diene polymers.

The crosslinkable copolymer of the present invention is conventionally polymerized by a thermally initiated solution polymerization process of a monomer mixture comprising one or more of the aforedescribed saturated hydrocarbon polymers and one or more ethylenically unsaturated monomers having on average 1 to 10, preferably 1 to 4 and more preferably 1 to 2 hydroxyl groups.

The monomer mixture typically includes in the range of from 70 parts to 99 parts of said ethylenically unsaturated monomers and 1 part to 30 parts, preferably 2 parts to 20 parts and more preferably 3 parts to 12 parts of said saturated hydrocarbon polymer, all in parts by weight based on 100 parts by weight of said crosslinkable component.

The crosslinkable copolymer of the present invention can have a GPC number average molecular weight in the range of from 2000 to 20,000 preferably 2200 to 8000 and more preferably 2500 to 4000. The crosslinkable copolymer of the present invention can have a Tg in the range of from −40° C. to +70° C., preferably −30° C. to +50° C. and more preferably −20° C. to 30° C.

Some of the suitable ethylenically unsaturated monomers include acrylic ester monomers, such as hydroxy alkyl (meth) acrylates wherein alkyl group includes 1 to 4 carbon atoms. Some examples of hydroxy alkyl (meth)acrylates include hydroxyethyl (meth)acrylate (primary), hydroxybutyl (meth) acrylate (all isomers, primary and secondary) and hydroxypropyl (meth)acrylate (all isomers, primary and secondary). The monomer mixture can further include the following ethylenically unsaturated monomers which include acrylic ester monomers, such as methyl (meth)acrylate, ethyl (meth)acrylate, butyl (meth)acrylate, cyclohexyl(meth)acrylate, 2-ethylhexyl (meth)acrylate, decyl (meth)acrylate, lauryl (meth)acrylate, isobornyl (meth)acrylate, isodecyl (meth)acrylate, oleyl (meth)acrylate, palmityl (meth)acrylate, stearyl (meth)acrylate, and acetoacetoxy ethyl (meth)acrylate; acrylamide or substituted acrylamides; styrene or alkyl substituted styrenes; butadiene; ethylene; vinyl acetate; vinyl ester of "Versatic" acid (a tertiary monocarboxylic acid having $C_9$, $C_{10}$ and $C_{11}$ chain length, vinyl monomers, such as, for example, vinyl chloride, vinylidene chloride, vinyl pyridine, N-vinyl pyrrolidone; amino monomers, such as, for example, N,N'-dimethylamino (meth)acrylate; chloroprene and acrylonitrile or methacrylonitrile; carboxyl monomers, such as acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, and phosphoethyl methacrylate.

The monomer mixture can preferably further include styrene, methyl (meth)acrylate, cyclohexyl(meth)acrylate, benzyl (meth)acrylate, isobornyl (meth)acrylate, ethylhexyl (meth)acrylate, butyl (meth)acrylate, isobutyl (meth)acrylate, laurel (meth)acrylate, propyl (meth)acrylate, isopropyl (meth)acrylate, (meth)acrylic acid, itaconic acid, or a combination thereof.

Preferably, the crosslinkable copolymer is polymerized from a monomer mixture of about 20 to 30% by weight cyclohexyl(meth)acrylate, 10 to 70% by weight ethylhexyl (meth)acrylate, 5 to 25% by weight hydroxyethyl (meth)acrylate, and 1 to 10% of the saturated hydrocarbon polymer, optionally up to 30% by weight styrene, and up to 30% by weight methyl methacrylate, all weight percentages based on the total weight of monomer solids.

The crosslinkable copolymer can be also prepared by solution polymerization in which the monomer mixture, conventional solvents, polymerization initiators, such as peroxy acetate, are heated to 70° C. to 175° C. for 1 to 12 hours.

The crosslinkable component can contain, in the range of from 0.1 percent to 50 percent based on the weight of the crosslinkable and crosslinking components, a flow modifying resin, such as a well-known non-aqueous dispersion (NAD), all percentages being based on the total weight of composition solids.

The non-aqueous dispersion-type polymer is prepared by dispersion polymerizing at least one vinyl monomer in the presence of a polymer dispersion stabilizer and an organic solvent. The polymer dispersion stabilizer may be any of the known stabilizers used commonly in the field of non-aqueous dispersions.

The crosslinkable component of the present invention can be also blended with reactive oligomers covered in U.S. Pat. No. 6,221,494, and non-alicyclic (linear or aromatic) oligomers, if desired. Such non-alicyclic-oligomers can be made by using non-alicyclic anhydrides, such as succinic or phthalic anhydrides, or mixtures thereof. Caprolactone oligomers described in U.S. Pat. No. 5,286,782 can also be used.

The crosslinkable component can further include polyesters, acrylic polymers, polyethers, polyols or a combination thereof.

The crosslinkable component can further include one or more conventional crosslinking catalysts, such as organo tin catalysts, which include dibutyl tin dilaurate, dibutyl tin diacetate, stannous octoate, and dibutyl tin oxide. Dibutyl tin dilaurate is preferred. The crosslinkable component typically includes in the range of from 0.001 parts to 5 parts, preferably in the range of from 0.005 parts to 2 parts, more preferably in the range of from 0.01 parts to 1 part of said crosslinking catalyst, all in parts by weight based on 100 parts by weight of said crosslinkable and said crosslinking components.

The crosslinking component of the composition includes one or more cycloaliphatic polyisocyanates, which range from 12 to 25 percent, preferably 14 to 22 weight percent and most preferably 15 to 20 weight percent, all weight percentages based on the total weight of the crosslinkable and crosslinking components solids If more the 25 weight percent of cycloaliphatic polyisocyanate is used, the resulting coating will not adhere to the underlying untreated resinous substrate and if the less 12 percentage of cycloaliphatic polyisocyanate is used, other coating properties, such as durability and mechanical strength, the resulting coating will be adversely affected.

While not wishing to be bound to any one theory, it is believed that a portion of the pot mix containing the crosslinkable copolymer of the present invention and the crosslinking component containing the cycloaliphatic isocyanates penetrates the resinous substrate, entangles with polymer chains that compose the resinous substrate and crosslinks within the resinous substrate and across the interface between the resinous substrate and the coating formed from the rest of the pot mix, thus stitching the coating to the resinous substrate thereby permitting adhesion of the coating to the resinous substrate. The coating formed by the pot mix may be a used as a direct to resinous primer, a direct to resinous basecoat or even a direct to resinous topcoat over resins used as automotive body panels.

As a result, a need to treat the resinous surface to improve adhesion of coating thereon can be eliminated without adversely affecting other desired coating properties, such as appearance, adhesion, and chemical and physical resistance.

Cycloaliphatic polyisocyanates suitable for use in the present invention are of the formula:

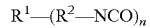

$$R^1-(R^2-NCO)_n$$

wherein $R^1$ is a cycloaliphatic group which can be optionally bridged. $R^1$ contains 3 to 20, preferably 4 to 10 and more preferably 5 to 8 carbon atoms in the ring. $R^2$ is independently chosen from a direct bond or a straight or branched aliphatic group having from 1 to 6 carbon atoms, preferably 1 to 4 and more preferably 1 to 2 and wherein n ranges from 2 to 10, preferably from 2 to 8 and more preferably from 2 to 5. The preferred isocyanate is chosen from the monomeric form of the isocyanate or the so-called 'homopolymer isocyanates' resulting from the isocyanates being dimerized, trimerized, or other wise oligomerized via known methods. One such preferred example is the isocyanaurate trimer of isophorone diisocyanate available from Bayer Material Science, Pittsburgh, Pa. under the trade mark Desmodur® Z4470.

Some of examples of suitable cycloaliphatic polyisocyanates include di-, tri- or tetraisocyanates which may or may not be ethylenically unsaturated, such as, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, dicyclohexylmethane-4,4'-diisocyanate, 3,3'-dimethyl-dicyclohexylmethane-4,4'-diisocyanate, polyisocyanates having isocyanurate structural units, the adduct of 2 molecules of a diisocyanate, such as isophorone diisocyanate, and a diol such as ethylene glycol, the adduct of 1 molecule of trimethylol propane and 3 molecules of isophorone diisocyanate.

If desired, the crosslinking component can include other polyisocyanates, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, trans-vinylidene diisocyanate, toluene diisocyanate, 1,3-bis(1-isocyanato 1-methylethyl)benzene, 1,4-bis(1-isocyanato-1-methylethyl)benzene, 1,3-bis(isocyanatomethyl)benzenexylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, diisocyanatonaphthalene, and combination thereof.

Preferably, the crosslinking component can include small amount of other polyisocyanates, such as one or more trimers of hexamethylene diisocyanate, meta-tetramethylxylylene diisocyanate, toluene diisocynate, or a combination thereof.

When the aforedescribed polyisocyanates are used, the crosslinkable component is stored separately from the crosslinking component as part of a two-pack coating composition, wherein these components are mixed prior to use to form a pot mix, which is then applied by conventional means such as spraying devices or roller applicators over the resinous substrates.

Alternatively, the isocyanates groups on the aforedescribed polyisocyanates can be blocked with a monomeric alcohol to prevent premature crosslinking in a one-pack coating composition. Some of the suitable monomeric alcohols include methanol, ethanol, propanol, butanol, isopropanol, isobutanol, hexanol, 2-ethylhexanol and cyclohexanol. The preferred monomeric alcohol are 2-ethylhexanol and cyclohexanol.

The composition typically includes one or more solvents such as organic solvent selected from aromatic hydrocarbons, such as petroleum naphtha or xylenes; ketones, such as, methyl amyl ketone, methyl isobutyl ketone, methyl ethyl ketone or acetone; esters, such as, butyl acetate or hexyl acetate; glycol ether esters, such as propylene glycol monomethyl ether acetate; and combination thereof. The composition generally includes in the range of 10% to 85%, preferably 20% to 60%, more preferably 30% to 40% of the aforedescribed solvents, all the percentages being in weight percent based on the total weight of the coating composition. The solvent or a mixture of solvents is typically included in the crosslinking and crosslinkable components. Preferably, the solvent is selected or the mixture of solvents is adjusted to render the crosslinkable copolymer miscible in it.

The coating composition of the present invention can also contain conventional additives, such as pigments, pigment dispersants, stabilizers, rheology control agents, flow agents, toughening agents and fillers. Selection of such additional additives would, obviously, depend on the intended use of the coating composition. The foregoing additives may be added to either the crosslinkable or crosslinking component, or both, depending upon the intended use of the coating composition. When the present coating composition is used as a basecoat, typical pigments that can be added to the composition include the following: metallic oxides, such as titanium dioxide, zinc oxide, iron oxides of various colors, carbon black; filler pigments, such as talc, china clay, barytes, carbonates, silicates; and a wide variety of organic colored pigments, such as quinacridones, copper phthalocyanines, perylenes, azo pigments, indanthrone blues, carbazoles, such as carbozole violet, isoindolinones, isoindolones, thioindigo reds, benzimidazolinones; metallic flake pigments, such as aluminum flakes.

In addition to the foregoing, to improve weatherability of a clearcoat or pigmented topcoat of the coating composition, the coating composition when formulated as a clear composition can include about 0.1 to 5% by weight, based on the weight of the composition solids, of an ultraviolet light stabilizer or a combination of ultraviolet light stabilizers and absorbers may be added. These stabilizers include ultraviolet light absorbers, screeners, quenchers and specific hindered amine light stabilizers. Also, about 0.1 to 5% by weight, based on the weight of the composition solids, of an antioxidant can be added. Most of the foregoing stabilizers are supplied by Ciba Specialty Chemicals, Tarrytown, N.Y.

In use, when the coating composition is packed as a two pack coating composition, the crosslinkable and crosslinking components of the coating composition are mixed just prior to use to form a pot mix, which has limited pot life typically ranging from 10 minutes to 24 hours. A pot mix layer is typically applied to a substrate by conventional techniques, such as spraying, electrostatic spraying, roller coating, dipping or brushing. The pot mix layer then cures under ambient conditions in the range of 10 minutes to 24 hours, preferably in the range of 60 minutes to 16 hours or overnight to form a coating on the substrate having the desired coating properties. It is understood that the actual curing time depends upon the thickness of the applied layer, the type of crosslinking chemistry being used and on the presence or absence of any suitable drying devices, such as fans that assist in continuously flowing air over the coated substrate to accelerate the dry rate. If desired, baking the coated substrate at a temperature of about 60 to 82° C. for about 30 minutes may further accelerate the cure rate. The foregoing baking step is particularly useful under OEM (Original Equipment Manufacture) conditions.

When the coating composition is packaged as a one-pack composition, a layer of the coating composition is applied in a manner similar to that described earlier. However, since the crosslinking groups in the crosslinking components are blocked, the layer is typically subjected to bake cure temperatures to unblock the crosslinking groups so that they can crosslink with the crosslinkable groups presented in the crosslinkable component. Typically baking step takes place at baking temperatures ranging from 60° C. to 200° C., preferably ranging from 80° C. to 160° C., for about 10 to 60 minutes.

The present invention is directed to a method of producing a multi coat system, preferably a multi coat OEM or refinish system that includes the coating composition of the present invention. The coating composition may be used as a primer coat, a basecoat in a basecoat/clearcoat system, a clearcoat in a basecoat/clearcoat system, or in a topcoat in a single coat or muti-coat system. Each of these systems is well known in the art.

The suitable substrates for applying the coating composition of the present invention include resinous automobile bodies, body inserts or body panels, any and all resinous items manufactured and painted by automobile sub-suppliers, commercial resinous truck bodies, including but not limited to beverage transport truck bodies, utility bodies, ready mix concrete delivery vehicle bodies, waste hauling vehicle bodies, and fire and emergency vehicle bodies, as well as any potential resinous attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft. The resinous substrate further includes those used in industrial and commercial new construction and maintenance thereof; amusement park equipment; railroad cars; machinery; OEM tools; signage; fiberglass structures; toys; sporting goods; golf balls; and sporting equipment.

The features and advantages of the present invention will be more readily understood, by those of ordinary skill in the art, from a reading of the foregoing detailed description. It is to be appreciated those certain features of the invention, which are, for clarity, described above in the context of separate embodiments, can also be provided in combination in a single embodiment. Conversely, various features of the invention that are, for brevity, described in the context of a single embodiment, can also be provided separately or in any sub-combination. In addition, references in the singular can also include the plural (for example, "a" and "an" may refer to one, or one or more) unless the context specifically states otherwise.

EXAMPLES

Test Procedures were followed according to the following known procedures.

Persoz Hardness Test

The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) were recorded.

Swell Ratio

The swell ratio of a free film (removed from a glass sheet) was determined by swelling the film in methylene chloride. The free film was placed between two layers of aluminum foil and using a Ladd grid punch, a disc of about 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few seconds and then a glass slide was placed over the film and the swollen film diameter ($D_s$) was measured. The swell ratio was then calculated as follow:

Swell Ratio=$(D_s)^2/(D_o)^2$

X-Hatch Adhesion

Using a sharp razor blade, scalpel, knife or other cutting device, two cuts are made into the coating with a 30-45 degree angle between legs and down to the substrate which intersects to form an "X". A steel or other hard metal straightedge is used to ensure straight cuts. Tape is placed on the center of the intersection of the cuts and then removed rapidly. The X-cut area is then inspected for removal of coating from the substrate or previous coating and rated. A standard method for the application and performance of this test is given as ASTM D6677.

Cross-Hatch Adhesion

The cross hatch tape test is primarily intended for use in the laboratory on coatings less than 5 mils (125 microns) thick. It uses a cross-hatch pattern rather than the X pattern. A cutting guide or a special cross-hatch cutter with multiple preset blades is needed to make sure the incisions are properly spaced and parallel. After the tape has been applied and pulled off, the cut area is then inspected and rated. The foregoing test is based on a standard method for the application and performance of these adhesion tests available in ASTM D3359. For the purposes of this invention, the adhesion is rated on a sliding scale, which ranges from 0 (no adhesion, i.e., total failure) to 10 (complete adhesion, i.e., total success). A rating of 6 and higher is preferable and a rating of 9 and higher is more preferable.

Preparation of Crosslinkable Copolymer 1

All weights are in grams unless otherwise specified.

Charge 1 described below was added to a flask equipped with an addition funnel, stirrer, thermometer, condenser, and a nitrogen blanket and then heated to reflux. Thereafter, Charge 2, described below, was added to the flask over a period of three hours while maintaining reflux. After the addition of Charge 2, the temperature of the flask content was reduced to 120° C. and Charge 3 described below was added over a 30-minute period via an addition funnel. The temperature of the flask content was then held at 120° C. for 30 minutes, then cooled and filled out. The resulting copolymer had a GPC number average weight of 3054, Tg of −17° C. at 60.34% solids.

Charge 1

| | |
|---|---|
| Xylene | 47.5 |
| Saturated hydrocarbon polymer* | 12.5 |

*Kraton ® Liquid Polymer L2203 telechelic polymeric diol supplied by Kraton Liquid Polymers of Houston, Texas.

Charge 2

| | |
|---|---|
| Ethylhexylmethacrylate | 64.0 |
| Styrene | 16.0 |
| Hydroxyethlymethacrylate | 20.0 |
| Initiator* | 3.0 |

*Luperox ® 7M75, t-Butyl peroxyacetate supplied by Arekma, Inc., Philadelphia, Pennsylvania.

Charge 3

| | |
|---|---|
| Xylene | 16.67 |
| Initiator* | 0.5 |

*Trigonox ® 41-c75, t-Butyl peroxyisobutyrate supplied by Akzo Nobel NV, Netherlands

Comparative Polymer 1

The same procedure described in the preparation of Crosslinkable Copolymer 1 above was followed, except for the absence of saturated hydrocarbon polymer.

Charge 1

| | |
|---|---|
| Xylene | 44.0 |

Charge 2

| | |
|---|---|
| Ethylhexylmethacrylate | 64.0 |
| Styrene | 16.0 |
| Hydroxyethylmethacrylate | 20.0 |
| Initiator* | 3.0 |

*Luperox ® 7M75, t-Butyl peroxyacetate supplied by Arekma, Inc., Philadelphia, Pennsylvania.

Charge 3

| | |
|---|---|
| Xylene | 16.67 |
| Initiator* | 0.5 |

*Trigonox ® 41-c75, t-Butyl peroxyisobutyrate supplied by Akzo Nobel NV, Netherlands

Preparation of Coating Composition A

Crosslinkable Component:

| | |
|---|---|
| Crosslinkable copolymer 1 | 34.78 |
| 4% dibutyl tin dilaurate in xylene | 3.09 |
| 4.8% zinc naphthenate in xylene | 1.23 |
| Aromatic 150 solvent* | 5.51 |

*Aromatic 150 solvent supplied by ExxonMobile, Houston, Texas.

Crosslinking Component:

| | |
|---|---|
| Cycloaliphatic polyisocyanate* | 5.37 |

*Desmodur ® Z4470 sn/ba, supplied by Bayer MaterialScience, Pittsburgh, Pennsylvania, is the isocyanurate of isophorone diisocyanate.

Crosslinking component was added to previously mixed crosslinkable component with stirring to form a pot mix, which was not turbid indicating that there was miscibility with no phase separation. Coating Composition A was applied to three Solvay exterior grade thermoplastic polyolefin panels supplied by Act Laboratories, Hillsdale, Mich. and to three glass panels with a bird type applicator having a 0.254 mm (0.010 inch) clearance and cured according to the following schedules:

Plastic panel 1 and glass panel 1 was cured overnight at 25° C. (77° F.).

Plastic panel 2 and glass panel 2 was baked for 30 minutes at 60° C. (140° F.) and allowed to cure further overnight at 25° C. (77° F.).

Plastic panel 3 and glass panel 3 was baked for 30 minutes at 82° C. (180° F.) and allowed to further cure overnight at 25° C. (77° F.).

Each of the cured glass panels 1, 2 and 3 exhibited a clear film without any visible phase separation.

The glass panels were rated for their swelling ratios and Persoz hardness after they had been cured. Swelling ratio on glass panel 1 was determined to be 2.28 and Persoz hardness was determined to be 64. Swelling ratio on glass panel 2 was determined to be 2.02 and Persoz hardness was determined to be 63. Swelling ratio on glass panel 3 was determined to be 2.07 and Persoz hardness was determined to be 70. Each coating applied over a plastic panel was tested for X-hatch and cross-hatch adhesion.

All plastic panels were aged at 25° C. (77° F.) for 7 days and retested for adhesion. Then all plastic panels were subjected to 100% humidity at 38° C. (100° F.) for 7 days and retested for adhesion.

Results are shown in Table 1.

TABLE 1

| | Plastic Panel | | |
|---|---|---|---|
| | 1 | 2 | 3 |
| 1 day X-hatch adhesion | 10 | 10 | 10 |
| 1 day Cross-hatch adhesion | 10 | 8 | 10 |
| 7 day X-hatch adhesion | 10 | 10 | 10 |
| 7 day Cross-hatch adhesion | 10 | 9 | 10 |
| 14 day humidity X-hatch adhesion | 10 | 10 | 8 |
| 14 day humidity cross-hatch adhesion | 10 | 10 | 10 |
| $T_g$ by DSC (° C.) | 37.7 | 55.8 | 50.6 |

From the foregoing results, it can be seen that the Coating Composition A of the present invention provides better than acceptable adhesion to polyolefin panels under various curing and exposure conditions.

The following coating compositions were prepared for testing using the ingredients given in Table 2. All amounts listed in Table 2 are in grams unless otherwise specified.

The same procedure as that provided for preparing Coating Composition A above, was followed in coating compositions listed below in Table 2. Each coating solution showed a clear mixture, thus no phase separation was observed. Each composition was applied to two Solvay exterior grade thermoplastic olefin panels and to two glass panels with a bird type applicator having a 0.254 mm (0.010 inch) clearance and cured according to the following schedules:

Plastic panel 1 and glass panel 1 was baked for 30 minutes at 60° C. (140° F.) and allowed to cure further overnight at 25° C. (77° F.).

Plastic panel 2 and glass panel 2 was baked for 30 minutes at 82° C. (180° F.) and allowed to cure further overnight at 25° C. (77° F.).

TABLE 2

| Coating Compositions | NCO/OH ratio | Crosslinkable copolymer 1 | Comparative polymer 1 | Liquid Diol[1] | Catalyst[2] | Solvent[3] | Isocyanate |
|---|---|---|---|---|---|---|---|
| B | 0.5/1 | 35.06 | 0 | 0 | 4.99 | 4.52 | 5.41[4] |
| C | 0.6/1 | 34.02 | 0 | 0 | 4.99 | 4.67 | 6.3[4] |
| D | 0.7/1 | 33.05 | 0 | 0 | 4.99 | 4.8 | 7.15[4] |
| E | 0.8/1 | 32.13 | 0 | 0 | 4.99 | 4.93 | 7.94[4] |
| F | 0.9/1 | 31.26 | 0 | 0 | 4.99 | 5.05 | 8.69[4] |
| G | 1/1 | 30.43 | 0 | 0 | 4.99 | 5.16 | 9.4[4] |
| H* | 0.5/1 | 0 | 35.21 | 0 | 4.99 | 4.1 | 5.69[4] |
| I* | 0.6/1 | 0 | 34.12 | 0 | 4.99 | 4.26 | 6.61[4] |
| J* | 0.7/1 | 0 | 33.1 | 0 | 4.99 | 4.42 | 7.48[4] |
| K* | 0.8/1 | 0 | 32.13 | 0 | 4.99 | 4.56 | 8.3[4] |
| L* | 0.9/1 | 0 | 31.22 | 0 | 4.99 | 4.7 | 9.08[4] |
| M* | 1/1 | 0 | 30.36 | 0 | 4.99 | 4.82 | 9.81[4] |
| N* | 0.5/1 | 0 | 32.3 | 2.4 | 4.99 | 4.88 | 5.41[4] |
| O* | 0.6/1 | 0 | 31.35 | 2.33 | 4.99 | 5.01 | 6.3[4] |
| P* | 0.7/1 | 0 | 30.45 | 2.26 | 4.99 | 5.14 | 7.14[4] |
| Q* | 0.8/1 | 0 | 29.6 | 2.2 | 4.99 | 5.25 | 7.94[4] |
| R* | 0.9/1 | 0 | 28.8 | 2.14 | 4.99 | 5.36 | 8.69[4] |
| S* | 1/1 | 0 | 28.04 | 2.08 | 4.99 | 5.47 | 9.4[4] |
| T* | 0.5/1 | 36.25 | 0 | 0 | 0.43[5] | 10.21 | 3.09[6] |

*Coating Compositions H through T were comparative examples.
[1] Liquid Diol is Kraton ® Liquid Polymer L2203 as an 80% solution in xylene supplied by Kraton Liquid Polymers, Houston, Texas.
[2] Catalyst is 0.2 weight percent based on total of crosslinkable and crosslinking components (Fascat ® 4202, which is a 1% solution of dibutyl tin dilaurate in xylene supplied by Arkema Inc, of Philadelphia, Pennsylvania).
[3] Aromatic 150 solvent supplied by ExxonMobile, Houston, Texas.
[4] Desmodur ® Z4470 polyisocyanate supplied by Bayer MaterialScience, Pittsburgh, Pennsylvania (isocyanurate of isophorone diisocyanates).
[5] Catalyst is 0.05 weight percent of dibutyltindilaurate and 0.05 weight percent of zinc naphthenate, wherein weight percentage is based on total of crosslinkable and crosslinking components.
[6] Desmodur ® N3300 polyisocyanate supplied by Bayer MaterialScience, Pittsburgh, Pennsylvania (isocyanurate of hexamethylene diisocyanates).

Each glass panel was evaluated for Persoz hardness and each of the plastic panels were rated for cross-hatch and X-hatch adhesion. The results are summarized in table 3.

TABLE 3

| Coating Composition | Glass panel 1 Persoz Hardness | Plastic panel 1 cross-hatch adhesion | Plastic panel 1 x-hatch adhesion | Glass panel 2 Persoz hardness | Plastic panel 2 cross-hatch adhesion | Plastic panel 2 x-hatch adhesion |
|---|---|---|---|---|---|---|
| B | 56 | 10 | 10 | 69 | 10 | 10 |
| C | 56 | 7 | 10 | 80 | 8 | 10 |
| D* | 85 | 8 | 8 | 134 | 10 | 0 |
| E* | 99 | 10 | 10 | 186 | 7 | 0 |
| F* | 93 | 5 | 0 | 167 | 5 | 1 |
| G** | 85 | 10 | 0 | 154 | 6 | 0 |
| H** | 58 | 1 | 0 | 170 | 0 | 0 |
| I** | 79 | 0 | 0 | 132 | 0 | 0 |
| J** | 73 | 0 | 0 | 142 | 0 | 0 |
| K** | 80 | 0 | 0 | 134 | 0 | 0 |
| L** | 114 | 0 | 0 | 180 | 0 | 0 |
| M** | 115 | 0 | 0 | 172 | 0 | 0 |
| N** | 59 | 10 | 9 | 111 | 10 | 10 |
| O** | 85 | 6 | 10 | 151 | 10 | 10 |
| P** | 93 | 9 | 10 | 143 | 10 | 10 |
| Q** | 113 | 5 | 10 | 147 | 10 | 0 |
| R** | 67 | 9 | 10 | 173 | 10 | 0 |
| S** | 87 | 6 | 4 | 189 | 9 | 0 |
| T** | 42 | 0 | 0 | 48 | 0 | 0 |

*Coating Compositions D through F are less preferred
**Coating Compositions H through T were comparative examples.

All glass panels showed a smooth textured film. On a glass panel, coatings from Coating Compositions A through M showed a clear film while coatings from Coating Compositions N to S were milky indicating that there was phase separation. Phase separation in coatings is undesired as it can cause problems with film integrity and pigment dispersion. Such a coating is also undesirable for use as a clear coating. Coating Compositions D through F, which have a NCO/OH ratio of more than 0.6/1, do not appear to have consistent adhesion. As a result, they are less preferred than coating compositions of the present invention having the NCO/OH ratio of 0.6/1 or less. Moreover, it can be seen from Table 3, that as the NCO/OH ratio increased from 0.6/1 to 1/1, adhesion to the underlying substrate attenuates.

However, it was still better than the coatings from Comparative Compositions H through M. Even though the coatings from Comparative Compositions N through S have good adhesion, as noted earlier, the pot mixes from those compositions have cloudy appearance, which, as noted earlier is undesirable. Thus, coating compositions containing the crosslinkable polymer of the present invention has acceptable adhesion and those, in additions, having the NCO/OH ratio of 0.6/1 or less have better adhesion while still providing desired compatibility (no phase separation), which was seen from its clarity.

Coating Composition U was prepared by using the same procedure as the one for Coating Composition A, i.e., by mixing Crosslinkable Copolymer 1 (35.06 g) with Desmodur® Z4470 sn/ba polyisocyanate (5.41 g) and 1% solution of dibutyl tin dilaurate in xylene (4.99 g) supplied Arkema, Inc. and Aromatic 150 solvent (4.52 g) available from ExxonMobile. The solution was clear indicating that there was no phase separation. A set of untreated resinous panels was wiped clean with DuPont 2320S plastic cleaner supplied by DuPont Company of Wilmington, Del. Coating Composition U was applied over two cleaned resinous panels and spread out using a 0.254 mm (0.010 inch) clearance bird applicator blade. The panels were air dried for 30 minutes and one set was baked at 82° C. (180° F.) for 30 minutes while the other was baked at 60° C. (140° F.) for 30 minutes. The panels were allowed to cool for 1 hour and were tested for adhesion. The results are given in table 4.

TABLE 4

| Plastic Substrate | GTX | RRIM | RIM* | ABS | SMC |
| --- | --- | --- | --- | --- | --- |
| 180 x-hatch adhesion | 9 | 7 | 0 | 4 | 9 |
| 180 cross-hatch adhesion | 10 | 3 | 1 | 2 | 10 |
| 140 x-hatch adhesion | 10 | 8 | 0 | 8 | 9 |
| 140 cross-hatch adhesion | 10 | 3 | 0 | 8 | 9 |

*Coatings applied over RIM substrate are not considered to be part of the present invention.
GTX, also known as Noryl GTX ® polyphenylene ether reinforced polyamide was supplied by GE Plastics, Fairfield, Connecticut.
RRIM is reinforced reaction injection molding resin.
RIM is Reaction Injection Molded resin.
ABS is a copolymer of acrylonitrile/butadiene/styrene.
SMC is Sheet Molded compound.

From the foregoing it can be seen that very good adhesion over a wide variety of untreated resinous substrates can be obtained by using the coating composition of the present invention.

What is claimed is:

1. A method of producing an adherent coating on a resinous substrate, said method comprising:
    (a) mixing a crosslinkable component with a crosslinking component of a coating composition to form a pot mix, said crosslinkable component comprising a polymeric mix containing at least one crosslinkable copolymer polymerized from a monomer mixture comprising one or more ethylenically unsaturated monomers having on average 1 to 10 hydroxyl groups and a saturated hydrocarbon polymer wherein said monomer mixture comprises in the range of from 70 parts to 99 parts of said ethylenically unsaturated monomers and 1 part to 30 parts of said saturated hydrocarbon polymer, all in parts by weight based on 100 parts by weight of said crosslinkable component; and crosslinking component comprising:

$R^1$—$(R^2$—NCO$)_n$ wherein $R^1$ is a substituted or unsubstituted cycloaliphatic group containing 3 to 20 carbon atoms in the ring, $R^2$ is independently selected from a direct bond, a straight aliphatic group or branched aliphatic group, wherein said aliphatic group has from 1 to 6 carbon atoms, and wherein n ranges from 2 to 10;
    (b) applying a layer of said pot mix over said resinous substrate; and
    (c) curing said coating on said resinous substrate.

2. The method of claim 1 wherein said saturated hydrocarbon polymer is a telechelic polymeric diol polymerized from butadiene.

3. The method of claim 1 wherein said crosslinkable copolymer has a GPC number average molecular weight in the range of from 2000 to 20,000.

4. The method of claim 1 wherein said crosslinkable copolymer has a Tg in the range of from −40° C. to 70° C.

5. The method of claim 1 wherein said monomer mixture further comprises styrene, methyl (meth)acrylate, cyclohexyl (meth)acrylate, benzyl (meth)acrylate, isobornyl (meth)acrylate, ethyl hexyl (meth)acrylate, butyl (meth)acrylate, isobutyl (meth)acrylate, laurel (meth)acrylate, propyl (meth)acrylate, isopropyl (meth)acrylate, (meth)acrylic acid, itaconic acid, or a combination thereof.

6. The method of claim 1 wherein said cycloaliphatic polyisocyanate is isocyanurate of isophorone diisocyanate.

7. The method of claim 1 wherein said cycloaliphatic polyisocyanate in said crosslinking component ranges from 12 to 25 weight percent based on the total weight of crosslinkable and crosslinking components.

8. The method of claim 1 wherein said crosslinking component further comprises one or more trimers of hexamethylene diisocyanate, meta-tetramethylxylylene diisocyanate, or toluene diisocyanate.

9. The method of claim 1 wherein said isocyanate groups are blocked by reacting said groups with a monomeric alcohol.

10. The method of claim 9 wherein said monomeric alcohol is an aliphatic alcohol.

11. The method of claim 10 wherein said aliphatic alcohol is cyclohexanol, 2-ethyl hexanol.

12. The method of claim 1 wherein said crosslinkable component further comprises one or more crosslinking catalysts.

13. The method of claim 12 wherein said composition comprises in the range of from 0.001 parts to 5.0 parts of said catalyst, all in parts by weight based on 100 parts by weight of said crosslinkable and said crosslinking components.

14. The method of claim 1 wherein said crosslinkable component further comprises one or more flow modifying resins.

15. The method of claim 1 comprising one or more solvents selected from the groups consisting of an organic solvent selected from the group consisting of aromatic hydrocarbons, ketones, esters, glycol ether esters and a combination thereof.

16. The method of claim 14 wherein said crosslinkable copolymer is miscible in said organic solvent.

17. The method of claim 1 or 15 wherein a VOC of said composition varies in the range of from 0.36 to 2.95 kilogram of an organic solvent per liter of the composition.

18. The method of claim 1 wherein said adherent coating is a primer coat, a basecoat in a basecoat/clearcoat system, a clearcoat in a basecoat/clearcoat system, or a topcoat in a single coat or multi-coat system.

19. The method of claim 1 or 18 wherein said resinous substrate is untreated.

20. The method of claim 19 wherein said resinous substrate is made of polyphenylene ether reinforced with polyamide, a copolymer of acrylonitrile butadiene styrene, polyolefin, or sheet molding compound.

21. The method of claim 20 wherein said resinous substrate is an autobody part.

22. A method of producing an adherent coating on a resinous substrate, said method comprising:
   (a) mixing a crosslinkable component with a crosslinking component of a coating composition to form a pot mix, said crosslinkable component comprising a polymeric mix containing at least one crosslinkable copolymer polymerized from a monomer mixture consisting essentially of;
      (i) one or more ethylenically unsaturated monomers having on average 1 to 10 hydroxyl groups,
      (ii) ethylenically unsaturated monomers selected from the group consisting of methyl (meth)acrylate, ethyl (meth)acrylate, butyl (meth)acrylate, isobutyl (meth)acrylate, cyclohexyl (meth)acrylate, 2-ethyl hexyl (meth)acrylate, decyl (meth)acrylate, lauryl (meth)acrylate, isobornyl (meth)acrylate, propyl (meth)acrylate, isopropyl (meth)acrylate, benzyl (meth)acrylate, isodecyl (meth)acrylate, oleyl (meth)acrylate, palmityl (meth)acrylate, stearyl (meth)acrylate, acetoacetoxy ethyl (meth)acrylate, acrylamide or substituted acrylamides, styrene or alkyl substituted styrenes, vinyl acetate, vinyl chloride, vinylidene chloride, vinyl pyridine, N-vinyl pyrrolidone, N,N'-dimethylamino (meth)acrylate; chloroprene, acrylonitrile, methacrylonitrile, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, phosphoethyl methacrylate and a combination thereof, and
      (iii) a saturated hydrocarbon polymer wherein said crosslinkable copolymer comprises in the range of from 70 parts to 99 parts of said ethylenically unsaturated monomers and 1 part to 30 parts of said saturated hydrocarbon polymer, all in parts by weight based on 100 parts by weight of said crosslinkable component; and wherein the crosslinking component comprises;

$$R^1-(R^2-NCO)_n$$

wherein $R^1$ is a substituted or unsubstituted cycloaliphatic group containing 3 to 20 carbon atoms in the ring, $R^2$ is independently selected from a direct bond, a straight aliphatic group or branched aliphatic group, wherein said aliphatic group has from 1 to 6 carbon atoms, and wherein n ranges from 2 to 10;

(b) applying a layer of said pot mix over said resinous substrate; and
   (c) curing said coating on said resinous substrate.

* * * * *